(12) United States Patent
Gatto

(10) Patent No.: US 6,285,281 B1
(45) Date of Patent: Sep. 4, 2001

(54) EMERGENCY MARINE LOCATOR SYSTEM

(76) Inventor: Steven M. Gatto, 7 Glen Burnie Ct., Sicklerville, NJ (US) 08081

( * ) Notice: Subject to any disclaimer, the term of this patent is extended or adjusted under 35 U.S.C. 154(b) by 0 days.

(21) Appl. No.: 09/597,300

(22) Filed: Jun. 20, 2000

(51) Int. Cl.[7] .................................................. H04Q 7/00
(52) U.S. Cl. ...................... 340/539; 340/573.6; 340/984; 342/357
(58) Field of Search ............................... 340/539, 573.6, 340/984, 996; 342/357, 457

(56) References Cited

U.S. PATENT DOCUMENTS

| | | | |
|---|---|---|---|
| 4,305,143 | 12/1981 | Simms et al. | 367/134 |
| 4,833,477 | * 5/1989 | Tendler | 342/389 |
| 5,274,359 | 12/1993 | Adams | 340/604 |
| 5,517,199 | * 5/1996 | DiMattei | 342/357 |
| 5,649,059 | * 7/1997 | Tendler et al. | 340/988 |
| 5,748,147 | * 5/1998 | Bickley et al. | 342/457 |
| 5,886,635 | 3/1999 | Landa et al. | 340/573.6 |
| 5,933,080 | 8/1999 | Nojima | 340/539 |
| 5,945,912 | 8/1999 | Guldbrand | 340/573.1 |
| 6,144,336 | * 11/2000 | Preston et al. | 342/357.09 |

* cited by examiner

Primary Examiner—Jeffery Hofsass
Assistant Examiner—Daniel Previl
(74) Attorney, Agent, or Firm—Henderson & Sturm LLP

(57) ABSTRACT

A fail safe marine locator system (10) for vessels (40) equipped with a marine radio (30) having a dial arrangement (32) for selecting an emergency broadcast frequency upon which a verbal distress call can be transmitted through a radio microphone (34) having a transmit button (33) and including an interface unit (11) having a microprocessor (20) that is coupled to a GPS interface terminal board (23) that will download data from a GPS satellite (60) via a GPS receiver 61. The downloaded data will be processed by the microprocessor circuit board (22) to transmit a digital data signal representative of the vessels location onto a verbal distress call when the microprocessor determines that the dial arrangement (32) is set on an emergency broadcast frequency and the transmit button (33) on the microphone (34) has been depressed.

5 Claims, 1 Drawing Sheet

EMERGENCY MARINE LOCATOR SYSTEM

BACKGROUND OF THE INVENTION

1. Field of the Invention

The present invention relates to the field of emergency message transmitting systems in general, and in particular to a system that transmits positional data to the Coast Guard upon depression of the talk button on a marine radio when the radio is transmitting on an emergency channel.

2. Description of Related Art

As can be seen by reference to the following U.S. Pat. Nos. 4,305,143; 5,274,359; 5,886,635; 5,933,080; and 5,945,912, the prior art is replete with myriad and diverse emergency position transmission systems for use in a marine environment.

While all of the aforementioned prior art constructions are more than adequate for the basic purpose and function for which they have been specifically designed, they are uniformly deficient with respect to their failure to provide a simple, efficient, and practical emergency data signaling system that is automatically actuated when the operator of a marine vessel sends out a verbal emergency call on a marine radio.

In the past E.P.I.R.B.'s, or emergency position indicating radio beacons, were only activated when a vessel sank or when someone on board would manually actuate the device. In addition, there also existed "man-overboard" systems that would radio the position of a mariner who had the misfortune to become separated from their vessel. However, none of these prior art arrangements took advantage of the very first action that any sailor or seaman would take in a time of crisis.

As a consequence of the foregoing situation, there has existed a longstanding need among mariners for a new and improved fail safe marine locator system that would immediately notify the Coast Guard of the positional location of a vessel simultaneously with the first broadcast of an emergency message on the marine radio, and the provision of such an arrangement is a stated objective of the present invention.

BRIEF SUMMARY OF THE INVENTION

Briefly stated, the fail safe marine locator system that forms the basis of the present invention comprises an interface unit that is coupled to a marine radio and a Global Positioning System or L.O.R.A.N., hereinafter GPS, to transmit both emergency voice and data messages to a Coast Guard facility so that the Coast Guard will immediately be informed of the vessels location as soon as an emergency signal is sent from the vessel.

As will be explained in greater detail further on in the specification, the interface unit is specifically designed such that the registration of the marine radio dial on one of a selected number of emergency broadcasting frequencies or channels will automatically download positional data from a GPS relative to the vessel's current location which when the talk button on the marine radio is depressed, will transmit digital data corresponding to the vessels current location as well as other pertinent information such as the vessels name, owner, certified number of passengers, size, make, model and year.

It should further be noted that the digital information will be transmitted in such a way that it will not interfere with the voice transmission over the radio and that the data signal is designed to be continuously broadcast for a selected period of time after the termination of a voice message to insure that the Coast Guard or other emergency response vessels can come directly to the aid of the stricken vessel.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
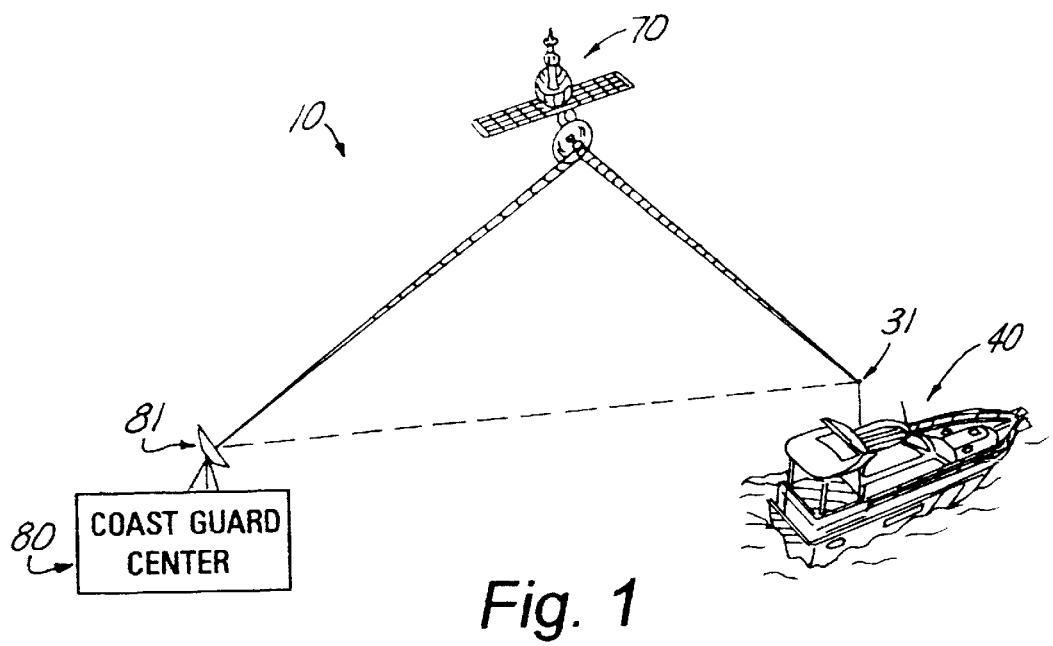
FIG. 1 is an overall perspective view of the fail safe marine locator system that forms the basis of this invention.
Figure 2:
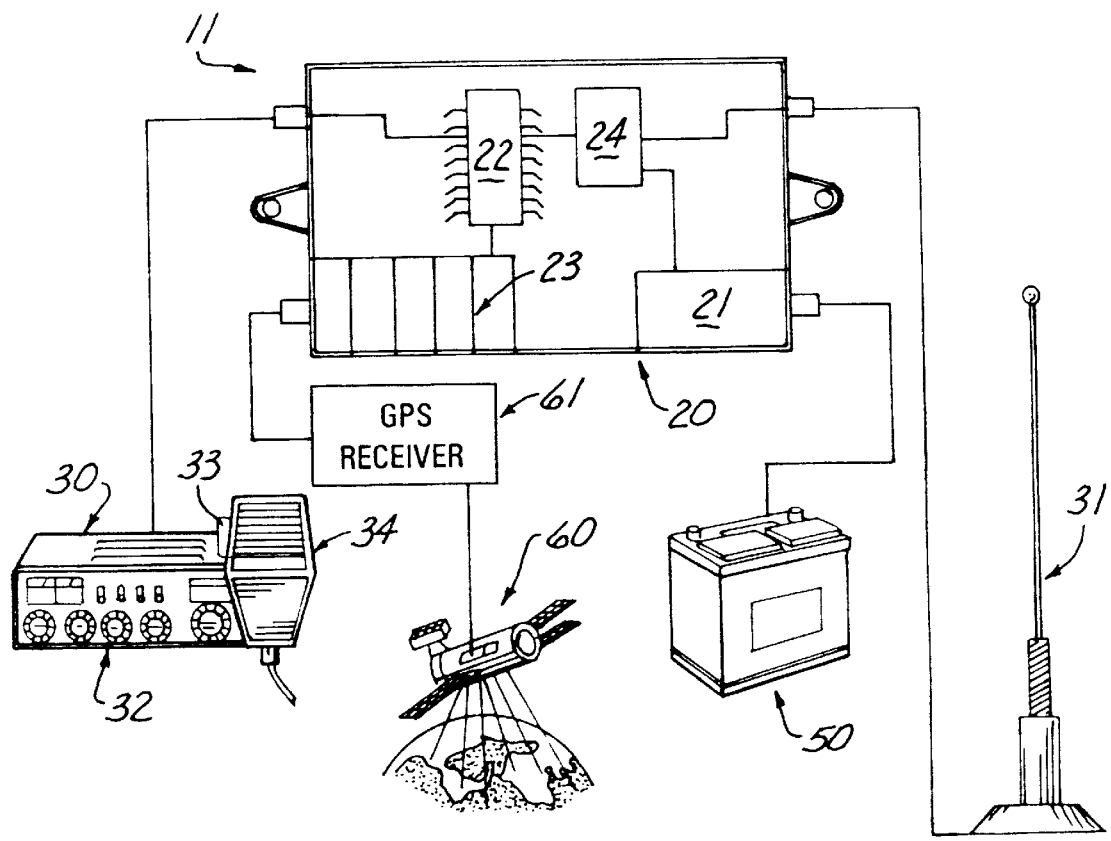
FIG. 2 is a schematic diagram of the operative connection between the interface unit and the other components that are employed in the system.

As can be seen by reference to the drawings, and in particular to FIG. 1, the fail safe marine locator system that forms the basis of the present invention is designated generally by the reference number 10. As shown in FIGS. 1 and 2, the marine locator system 10 comprises an interface unit 11 that is operatively connected to a marine radio 30 installed on a marine vessel 40. The interface unit 11 is electrically coupled to a power source 50 and in wireless communication with a satellite based Global Positioning System 60 via a GPS receiver 61 for downloading positional information relative to the vessel 40 which will be transmitted in digital format through the marine radio antennae 31 to a communications satellite 70 that will relay both voice and digital messages from the marine radio 30 to a receiver 81 at a Coast Guard facility.

As can best be appreciated by reference to FIG. 2, the interface unit 11 comprises in general a microprocessor 20 which may be powered either by the vessels power source 50 or by a self-contained re-chargeable battery power source 21. The microprocessor circuit board 22 is electrically coupled to the marine radio 30 and is programmed to be initially responsive to the position of the marine radio dial arrangement 32 coupled with the position of the "talk" or transmit button 33 on the radio microphone 34 as will be explained presently.

In addition, the microprocessor circuit board is also electrically coupled to a GPS interface terminal board 23 that is adapted to download positional data from global positioning satellites 60 relative to the present location of the vessel 40 when the GPS interface terminal board 23 is selectively activated on the microprocessor circuit board 22.

At the present time, the emergency channel for a VHF marine radio is channel 16 which broadcasts on 156.800 MHz, and on a single side band marine radio the dial setting is on 2182 KHz. As a consequence, the microprocessor circuit board 22 of this invention is programmed to detect either one of those dial settings, plus the depression or actuation of the talk button 33 on the marine radio 30 to download the digital data concerning the vessels location from the GPS interface terminal board 23 wherein that digital data is electronically piggybacked on the verbal message being transmitted from the marine radio microphone 34 through the interface unit transmitter 24 which transmits the voice and digital data through the marine radio antennae 31 to a communications satellite 70 which relays the information to a radio receiver 81 at a Coast Guard facility 80.

In this manner, as the Coast Guard facility is receiving an emergency distress call they are simultaneously receiving a digital data signal from the vessel involved which pinpoints the vessels location for Coast Guard rescue assist.

Furthermore, this locator system 10 relieves the operator and/or radio operator of the vessel of the need to verbalize their physical location under adverse circumstances and they can concentrate their verbal message on the condition of the vessel, as well as the vessel's passengers and crew.

It should also be noted that the microprocessor circuit board 22 is further programmed to continue the transmittal of the digital data for a predetermined period of time after the talk button 33 on the microphone has been released to insure that the vitally important positional data is received by the rescuers.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A fail safe marine locator system for vessels equipped with a marine radio having a microphone proved with a transmit button and a dial arrangement for acquiring an emergency channel frequency for transmitting a verbal distress call through an antennae to a communications satellite relay to a receiver at a Coast Guard facility wherein the locator system comprises:

an interface unit including a microprocessor having means for piggybacking a digital data signal onto the verbal distress call signal wherein the digital data signal corresponds to the location of the stricken vessel during the time that the distress call is being made and said microprocessor has a microprocessor circuit board which is responsive both to the position of the dial arrangement on the marine radio and the position of the transmit button on the marine radio microphone; and wherein the transmittal of the verbal distress call and the piggybacked digital data signal requires that the dial arrangement is on a designated emergency broadcast frequency and the transmit button on the marine radio microphone is depressed.

2. The locator system as in claim 1; wherein, said microprocessor is also provided with a means for downloading positional data from a GPS system and converting that data into said piggybacked digital data signal.

3. The locator system as in claim 2; wherein, said microprocessor circuit board is further provided with means for continuing the independent transmission of said digital data signal after the verbal distress call signal has been terminated.

4. The locator system as in claim 3 wherein independent transmission of said digital data signal continues for a predetermined amount of time.

5. The locator system as in claim 4 wherein the designated emergency broadcast frequency is selected from among the following: 156,800 MHz, 2182 KHz, and 157.1 MHz.

* * * * *